United States Patent
Krause

(10) Patent No.: US 10,509,742 B2
(45) Date of Patent: Dec. 17, 2019

(54) LOGICAL MEMORY BUFFERS FOR A MEDIA CONTROLLER

(71) Applicant: Hewlett Packard Enterprise Development LP, Houston, TX (US)

(72) Inventor: Michael R. Krause, Boulder Creek, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/155,235

(22) Filed: May 16, 2016

(65) Prior Publication Data

US 2017/0329710 A1    Nov. 16, 2017

(51) Int. Cl.
G06F 13/16    (2006.01)

(52) U.S. Cl.
CPC .......... *G06F 13/1673* (2013.01); *Y02D 10/14* (2018.01)

(58) Field of Classification Search
None
See application file for complete search history.

(56) References Cited

U.S. PATENT DOCUMENTS

| | | | |
|---|---|---|---|
| 7,620,793 B1 * | 11/2009 | Edmondson | G06F 12/0607 345/552 |
| 8,151,012 B2 | 4/2012 | Kim et al. | |
| 8,312,250 B2 | 11/2012 | Forhan et al. | |
| 8,806,112 B2 | 8/2014 | Somanache et al. | |
| 9,063,561 B2 | 6/2015 | Noeldner et al. | |
| 9,432,298 B1 * | 8/2016 | Smith | H04L 49/9057 |
| 9,703,696 B1 * | 7/2017 | Yiannacouras | G06F 12/023 |
| 2004/0230767 A1 * | 11/2004 | Bland | G06F 11/1666 711/203 |
| 2011/0078340 A1 * | 3/2011 | Kim | G11C 11/4082 710/18 |
| 2011/0078342 A1 * | 3/2011 | Siddabathuni | G06F 13/28 710/22 |
| 2011/0238934 A1 * | 9/2011 | Xu | G06F 13/1689 711/158 |
| 2014/0192583 A1 * | 7/2014 | Rajan | G11C 7/10 365/63 |
| 2017/0075571 A1 * | 3/2017 | Chen | G06F 3/061 |

FOREIGN PATENT DOCUMENTS

| | | |
|---|---|---|
| CN | 104346287 | 2/2015 |
| WO | WO-2015065431 | 5/2015 |

OTHER PUBLICATIONS

Gulur, N., et al; "Row-buffer Reorganization: Simultaneously Improving Performance and Reducing Energy in DRAMs"; 2011; 2 pages.

* cited by examiner

*Primary Examiner* — Larry T Mackall
(74) *Attorney, Agent, or Firm* — Hewlett Packard Enterprise Patent Department

(57) ABSTRACT

In some examples, a media controller includes a buffer and controller circuitry. The controller circuitry may receive, from a memory device linked to the media controller, an indication of a number of memory subunits that the memory device is divided into. The controller circuitry may also allocate, within the buffer, a number of logical memory buffers for the memory device greater than the number of memory subunits and indicate to a memory controller that a number of memory units accessible for the memory device is the number of logical memory buffers.

19 Claims, 5 Drawing Sheets

LOGICAL MEMORY BUFFERS FOR A MEDIA CONTROLLER

BACKGROUND

With rapid advances in technology, computing systems are used in virtually all aspects of society today. Computing systems and devices are increasing in complexity and processing capability, and many include complex memory systems to store immense amounts of data. Increases in the efficiency and capability of computing and memory systems will result in further widespread use and adoption of technology in nearly every facet of life.

BRIEF DESCRIPTION OF THE DRAWINGS

Certain examples are described in the following detailed description and in reference to the drawings.

DETAILED DESCRIPTION

Examples consistent with the present disclosure may support allocation and use of logical memory buffers by a media controller to cache data of memory devices managed by the media controller. As described in greater detail below, controller circuitry of a media controller may allocate a greater number of logical memory buffers (e.g., within a buffer or cache implemented by the media controller) than a number of memory subunits that a managed memory device is divided into. Then, the media controller may communicate the number of logical memory buffers to other computing circuitry or logic, such as an on-chip memory controller. In that regard, the media controller may transparently provision a greater number of logical memory buffers than the number of actual memory subunits (e.g., memory banks) of a memory device.

The logical memory buffer features described herein may provide increased efficiency in the processing of pending or outstanding memory requests by processing logic or circuitry of a computing system. The increased number of logical memory buffers (as compared to the actual number of memory subunits of a managed memory device) may result in increased memory access requests, and the media controller may leverage the outstanding requests to improve parallelism, pipeline requests, and adjust sequencing of memory access operations. Doing so may improve the performance, efficiency, and power usage of the computing system. Thus, the features described herein may result in improved latencies in processing memory requests, accelerated memory performance, and increased power efficiency.

Figure 1:
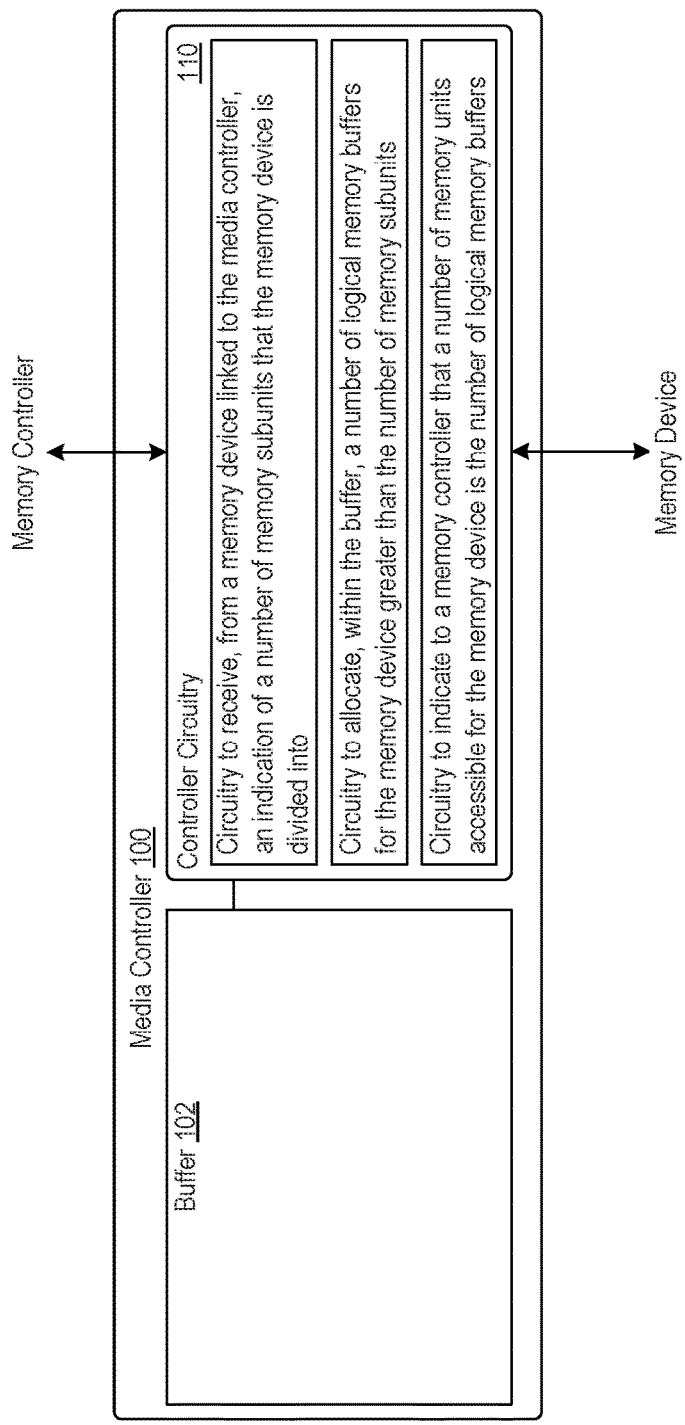
FIG. 1 shows an example of a media controller that supports allocation of logical memory buffers.

FIG. 1 shows an example of a media controller 100 that supports allocation of logical memory buffers. The media controller 100 may be any device that controls or supports access to memory media, including any non-volatile memory devices, volatile memory devices, or combinations of both. In some implementations, the media controller 100 manages access to multiple different memory devices and ma do so by processing memory access requests received from other devices or circuitry in a computing system. Examples of such other devices include microprocessors, graphics processing units (GPUs), input/output (I/O) logic, and memory controllers interfacing with or embedded on die with a microprocessor.

In some example architectures, a computing system includes both a media controller 100 and a memory controller. The memory controller may interface with processor(s) and other computing logic to access system memory. The media controller 100 may interface with and manage access to the memory devices that form the system memory, which may include volatile memory such as dynamic random access memory (DRAM) modules (which may include multiple memory chips subdivided into multiple memory banks), non-volatile memory such as disk storage or memristor arrays, or combinations of both types. In that regard, the media controller 100 may provide a layer of abstraction between the memory controller and the system memory of a computing system, allowing the media controller to specifically manage and control access to managed memory devices. In some examples, the memory controller-media controller architecture supports asynchronous communication of data exchanges between the controllers.

The media controller 100 may include a buffer 102 and controller circuitry 110. The buffer 102 may take the form of any storage medium, such as static random access memory (SRAM), embedded DRAM, or various other forms of on-chip memory. The media controller 100 may utilize the buffer 102 to cache data of the memory devices managed by media controller 100. In some examples, the buffer 102 may be an associative cache designed for a threshold hit-rate (e.g., 98%) and may include caching circuitry to meet threshold access speeds (e.g., 5 nanosecond access times).

The controller circuitry 110 may support provisioning of logical memory buffers within the buffer 102 to cache data of a memory device managed by the media controller 100. As described in greater detail herein, the controller circuitry 110 may provision logical memory buffers in the buffer 102 correlating to memory subunits of managed memory devices. In particular, the controller circuitry 110 may allocate a number of logical memory buffers in the buffer 102 greater than the memory subunits that a particular memory device is divided into. Doing so may support increased parallelism, efficiency, and performance in processing memory access requests.

In the example implementation in FIG. 1, the controller circuitry 110 includes circuitry to receive, from a memory device linked to the media controller, an indication of a number of memory subunits that the memory device is divided into; circuitry to allocate, within the buffer 102, a number of logical memory buffers for the memory device greater than the number of memory subunits; and circuitry to indicate to a memory controller that a number of memory units accessible for the memory device is the number of logical memory buffers (and not the number of memory subunits the memory device is divided into).

Through the allocated logical memory buffers, the controller circuitry 110 may process memory access requests targeting data stored in managed memory devices. As an example, the controller circuitry 110 may receive a memory access request from a memory controller, and the memory access request may target a particular logical memory buffer allocated for the memory device. Responsive to receiving the memory access request, the controller circuitry 110 may determine a particular memory subunit of the memory device that the particular logical memory buffer maps and perform the memory access request on the particular memory subunit.

As such, the controller circuitry 110 may support allocation and use of logical memory buffers to cache data stored in a memory device managed by a media controller 100. Example logical memory buffer features with respect to the media controller 100 and controller circuitry 110 are described in greater detail next. In many of the examples, managed memory devices include memory media divided into memory banks (for example, DRAM banks). However, the logical memory buffer features described herein may be consistently implemented by the media controller 100 or controller circuitry 110 to apply to memory devices and memory subunits of any type.

Figure 2:
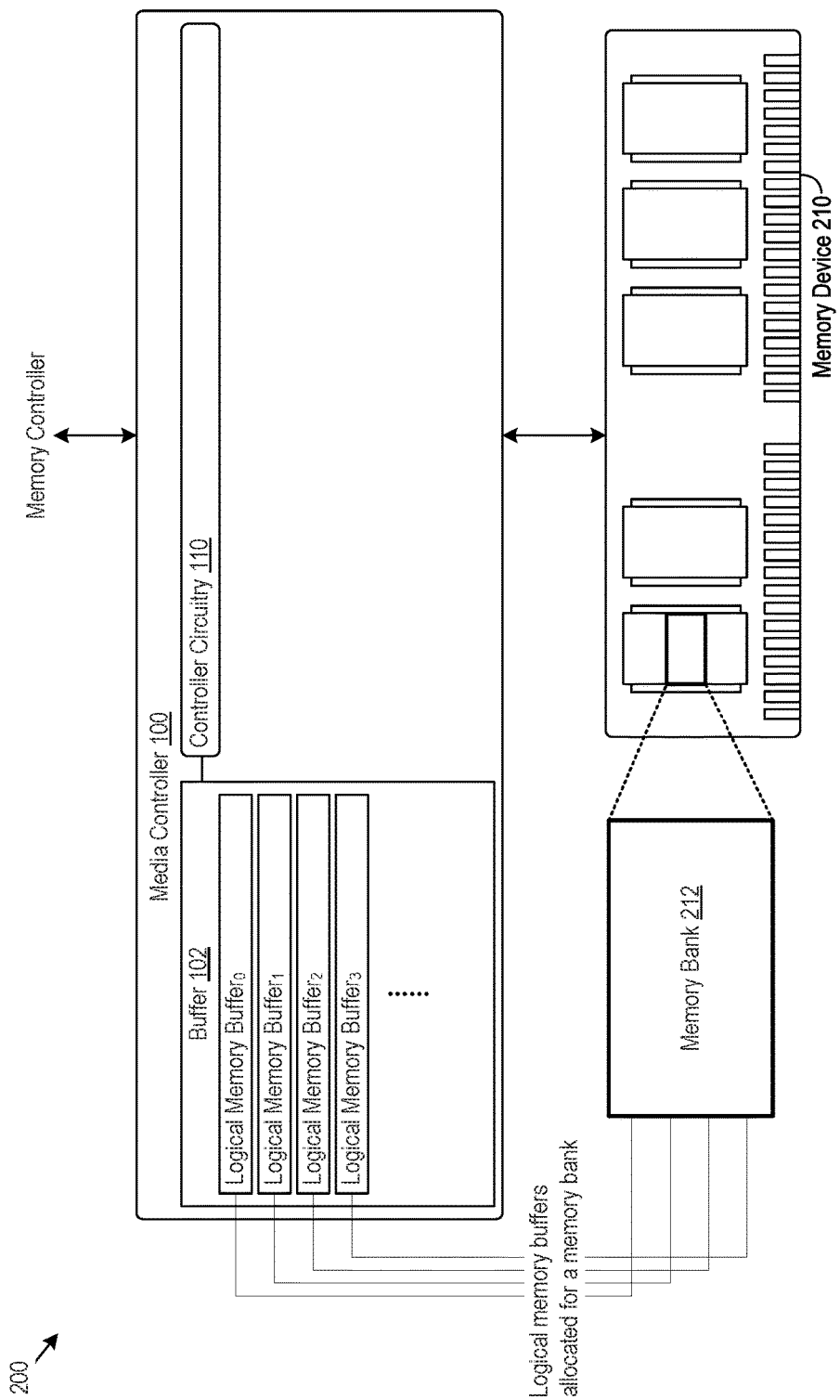
FIG. 2 shows an example of a system that supports allocation of logical memory buffers of a media controller.

FIG. 2 shows an example of a system 200 that supports allocation of logical memory buffers of a media controller. In the example shown in FIG. 2, a media controller 100 includes controller circuitry 110 and a buffer 102. The media controller 100 may control access to any number of memory devices, such as the memory device 210 shown in FIG. 2. In FIG. 2, the memory device 210 takes the form of a memory module (e.g., a DRAM module). Other examples of memory devices the media controller 100 may manage and control access to include memory chips, memory banks, non-volatile and/or volatile memory arrays, or memory media of any other degrees of granularity or geometry.

Memory devices controlled by the media controller 100 may be subdivided into any number of memory subunits. For example, the memory device 210 may be divided into multiple memory chips, each of which may be divided into a number of memory banks. An example memory bank of the memory device 210 is shown in FIG. 2 as the memory bank 212. Memory device divisions may be physical or logical in nature. For example, the memory device 210 may be divided physically via separate circuitry or through distinct portions of a hardware chip. Another memory device may be divided logically, for example as separate address ranges of a non-volatile memory array or in other ways.

The controller circuitry 110 may allocate logical memory buffers for the memory subunits of a memory device. To do so, the number of memory subunits a particular memory device is divided into may be determined by the controller circuitry 110. In some examples, the controller circuitry 110 receives an indication of such a number from the memory device itself, which may occur during a handshake or discovery process between the media controller 100 and managed memory devices. In other examples, the controller circuitry 110 may query the memory device, requesting the number of memory subunits that the memory device is divided into, including physical subunits, logical subunits (e.g., address ranges), or combinations of both.

In FIG. 2, the controller circuitry 110 may determine the number of memory banks that the memory device 210 is divided into and allocate a number of logical memory buffers within the buffer 102 to cache data for the memory banks of the memory device 210. Each of the logical memory buffers allocated for a particular memory subunit may serve as a cache for the particular memory subunit. Accordingly, the media controller 100 may implement a cache for the memory banks of the memory device 210 in the form of the logical memory buffers.

The controller circuitry 110 may allocate the logical memory buffers such that the number of allocated logical memory buffers is greater than the number of memory banks of the memory device 210. Put another way, the logical memory buffer to memory bank ratio may be greater than 1:1. To illustrate through FIG. 2, the controller circuitry 110 may allocate four different logical memory buffers for the memory bank 212 for a 4:1 logical memory buffer to memory bank ratio. Example logical memory buffers allocated for the memory banks 212 are shown in FIG. 2 as Logical Memory Buffer$_0$, Logical Memory Buffer$_1$, Logical Memory Buffer$_2$, and Logical Memory Buffer$_3$.

Along similar lines, the controller circuitry 110 may allocate multiple logical memory buffers for other memory banks of the memory device 210 as well (e.g., at the 4:1 ratio for the memory bank 212 or at any other configurable ratio). The buffer 102 may thus include a greater number of logical memory buffers than the number of memory banks (or other memory subunit) of the memory device 210. Upon allocation, the controller circuitry 110 may indicate to a memory controller that the number of memory units accessible for the memory device 210 is the number of allocated logical memory buffers (and not the number of memory banks that the memory device 210 is divided into).

To allocate multiple logical memory buffers to a particular memory subunit, the controller circuitry 110 may include mapping logic to correlate the multiple logical memory buffers to the particular memory subunit. For example, the controller circuitry 110 may map a particular memory bank to multiple logical memory buffers, such as the memory bank 212 to Logical Memory Buffer$_0$, Logical Memory Buffer$_1$, Logical Memory Buffer$_2$, and Logical Memory Buffer$_3$ allocated within the buffer 102. Each of the logical memory buffers may serve as a cache, mapped to and caching data particular to a portion of the memory bank 212 (e.g., a particular non-overlapping address range, set of bank rows, or any other delineation of the memory bank 212). For a received memory access request, the controller circuitry 110 may determine that the memory access request received by the media controller 100 targets one of the multiple logical memory buffers (e.g., targets a memory address cached by the Logical Memory Buffer$_2$) and process the memory access request by accessing the particular memory bank mapped to the targeted logical memory buffer (e.g., the memory bank 212).

By allocating multiple logical memory buffers for a particular memory bank (or other subunit) of a memory device, the controller circuitry 110 may, in effect, provision additional memory units that a memory controller or other computing logic can request access to. Described in a different way with reference to FIG. 2, the logical memory buffers allocated by the controller circuitry 110 may serve as "logical" memory banks mapping to physical memory bank 212. To a memory controller interfacing with the media controller 100, it may appear that multiple memory banks are accessible to which the memory controller may request data access to even though the multiple memory banks may map to the same physical memory bank.

As a consequence of the increased number of accessible memory units (in the form of logical memory buffers), the memory controller may send a greater number of memory access requests for accessing a particular memory bank. The controller circuitry 110 may leverage the greater number of outstanding memory access requests to increase parallelism in the memory accesses, increase power efficiency, reduce processing latencies of memory access requests, or achieve various other performance benefits. Thus, through allocating logical memory buffers at greater than a 1:1 logical memory buffer to memory subunit ratio, the controller circuitry 110 may improve the performance of a computing system.

Example mechanisms through which the controller circuitry 110 may leverage the allocated logical memory buffers are described next.

As noted above, the increased number of allocated logical memory buffers (as compared to the number of memory subunits of a managed memory device) may result in increased parallelism, increasing aggregate performance of a computing system. The controller circuitry 110 may receive multiple outstanding memory access requests (e.g., reads and writes) targeting a particular logical memory buffer, and pipeline the multiple memory access requests for processing with increased efficiency. For instance, the controller circuitry 110 may receive multiple memory access requests targeting a particular logical memory buffer and process the multiple memory access requests in parallel through a single access to a particular memory bank that the particular logical memory buffer maps to.

The controller circuitry 110 may also process, in parallel, memory access requests targeting the same memory subunit (e.g., the same memory bank of a DRAM module). As an example, the controller circuitry 110 may receive a first memory access request from the memory controller, the first memory access request targeting a first logical memory buffer allocated for a managed memory device as well as receive a second memory access request from the memory controller, the second memory access request targeting a second logical memory buffer allocated for the memory device. The controller circuitry 110 may determine that both the first and second logical memory buffers map to a particular memory subunit of the memory device and process the first and second memory access requests for the particular memory subunit in parallel.

In some examples, the controller circuitry 110 may sequence various memory access operations to take advantage of the pipelined memory access requests received for the allocated logical memory buffers. As the increased number logical memory buffers may result in an increased number of memory access requests, the controller circuitry 110 may adjust memory access sequences to improve performance and reduce latencies. For example, when memory access requests target DRAM or other volatile memory technologies, the controller circuitry 110 may adjust DRAM activate and precharge sequencing. In some instances, the controller circuitry 110 may delay selected precharge operations to enable an increased number of activations, e.g., activating bank rows to read or write data for multiple outstanding memory access requests in parallel.

Regarding the delayed precharge operations, the controller circuitry 110 may perform the precharge operations during subsequent memory bank idle periods. Describing the precharge features that the controller circuitry 110 may implement through the logical memory buffers in another way, the controller circuitry 110 may support lazy precharges. In doing so, the controller circuitry 110 may receive multiple memory access requests targeting a particular logical memory buffer allocated for a DRAM bank, and perform a lazy precharge operation on the DRAM bank in processing the multiple memory access requests. The controller circuitry 110 may thus leverage the increased number of outstanding memory access requests and effectively utilize the lazy precharge to successively activate multiple bank rows without interrupt from the precharges. Then, the controller circuitry 110 may group the precharge operations to flush multiple logical memory buffers to a particular DRAM bank together (which may take less time had each precharge taken place independently or serially).

As other examples of sequencing features for memory access operations, the controller circuitry 110 may opportunistically perform data write-backs for logical memory buffers mapped to a particular memory bank during idle periods. In some examples, the controller circuitry 110 may opportunistically write back data cached in the logical memory buffers mapped to a particular memory bank while simultaneously executing other memory read requests from other logical memory buffers also mapped to the particular memory bank. As yet another example, the controller circuitry 110 may inject a delay for executing a newly received memory write request during write-back. Through opportunistic write-backs leveraging increased outstanding memory access requests, the controller circuitry 110 may reduce subsequent access latencies to a memory device (e.g., DRAM). By doing so, the controller circuitry 110 may reduce or eliminate serially-executed precharge operations and the corresponding wait time before a subsequent activate may be issued. Such features may be particularly implemented by memory controller-media controller architectures that support asynchronous communications.

With memory access requests pipelined for allocated logical memory buffers, the controller circuitry 110 may also time memory access operations to take advantage of idle periods of managed memory subunits. During an idle period, the controller circuitry 110 may perform any number of media-specific operations for selected logical memory buffers, and do so without interfering with data path operations for other activated memory subunits. For example, the controller circuitry 110 may select logical memory buffers for volatile data refreshes, data scrubbing, row hammering, or any combination of other operations the controller circuitry 110 may execute as background processes. Along similar lines, the controller circuitry 110 may utilize a selected subset of the logical memory buffers for wear-leveling, garbage collection, spare device replacements, or other background operations during idle periods.

In some implementations, the controller circuitry 110 may variably adjust any number of characteristics of allocated logical memory buffers. The controller circuitry 110 may do so based on a particular type of managed memory device that the logical memory buffers are mapped to, and intended use for the logical memory buffers, or for specific workloads or applications executing on a computing system. In that regard, the controller circuitry 110 may adjust the size of the logical memory buffers, whether by increasing or decreasing the size of allocated logical memory buffers, for example based on application-specific requirements.

As an example, for streaming applications accessing large amounts of data sequentially, the controller circuitry 110 may increase the size of allocated logical memory buffers to support contiguous data accesses. Additionally or alternatively, the controller circuitry 110 may dynamically equate multiple logical memory buffers to a single buffer row, through which the controller circuitry 110 may retrieve data for the streaming or other sequential data-access application. As another example, for applications or workloads requiring random memory accesses, the controller circuitry 110 may reduce the size of the logical memory buffers. Doing so may reduce energy consumption and improve memory access performance.

In a consistent manner, the controller circuitry 110 may adjust the number of logical memory buffers allocated in the buffer 102 for managed memory devices based on specific workloads, applications, or specific types of memory media. That is, the controller circuitry 110 may adapt the number and size of allocated memory buffers to improve performance or tailor memory buffering characteristics to increase the effectiveness by which data stored in managed memory devices is accessed. In some examples, the controller circuitry 110 may allocate thousands of logical memory buffers or more, even when the managed memory device is divided into a significantly lesser number of subunits (e.g., a managed memory device divided into 8 or 16 memory banks). The increased number of logical memory buffers may increase parallelism and performance, allowing the controller circuitry 110 to pipeline and process the increased number of outstanding memory requests received from a memory controller. In some examples, the controller circuitry 110 makes logical memory buffer adjustments dynamically, and may communicate such adjustments to a memory controller through messages specifying an updated number of allocated logical memory buffers and their corresponding size or address range.

According to any of the description above, the controller circuitry 110 may receive memory access requests targeting logical memory buffers where the memory access requests are part of a particular workload. Then, the controller circuitry 110 may adapt an allocation of the logical memory buffers according to a characteristic of the particular workload. Example characteristics include the type of memory accesses utilized by the particular workload, frequency of such accesses, required access speed, etc. The controller circuitry 110 may adapt the allocation by increasing the number of allocated logical memory buffers, decreasing the number of allocated logical memory buffers, or adjusting a buffer size of the logical memory buffers. Then, the controller circuitry 110 may indicate adaptation of the logical memory buffers to the memory controller by indicating an adapted number of logical memory buffers, an adjusted size of the logical memory buffers, or both.

As yet another feature through which a media controller 100 may leverage the allocated logical memory buffers, the controller circuitry 110 may support spatial locality of memory access requests to increase the efficiency at which memory access requests are processed. Some spatial locality features are described next.

Figure 3:
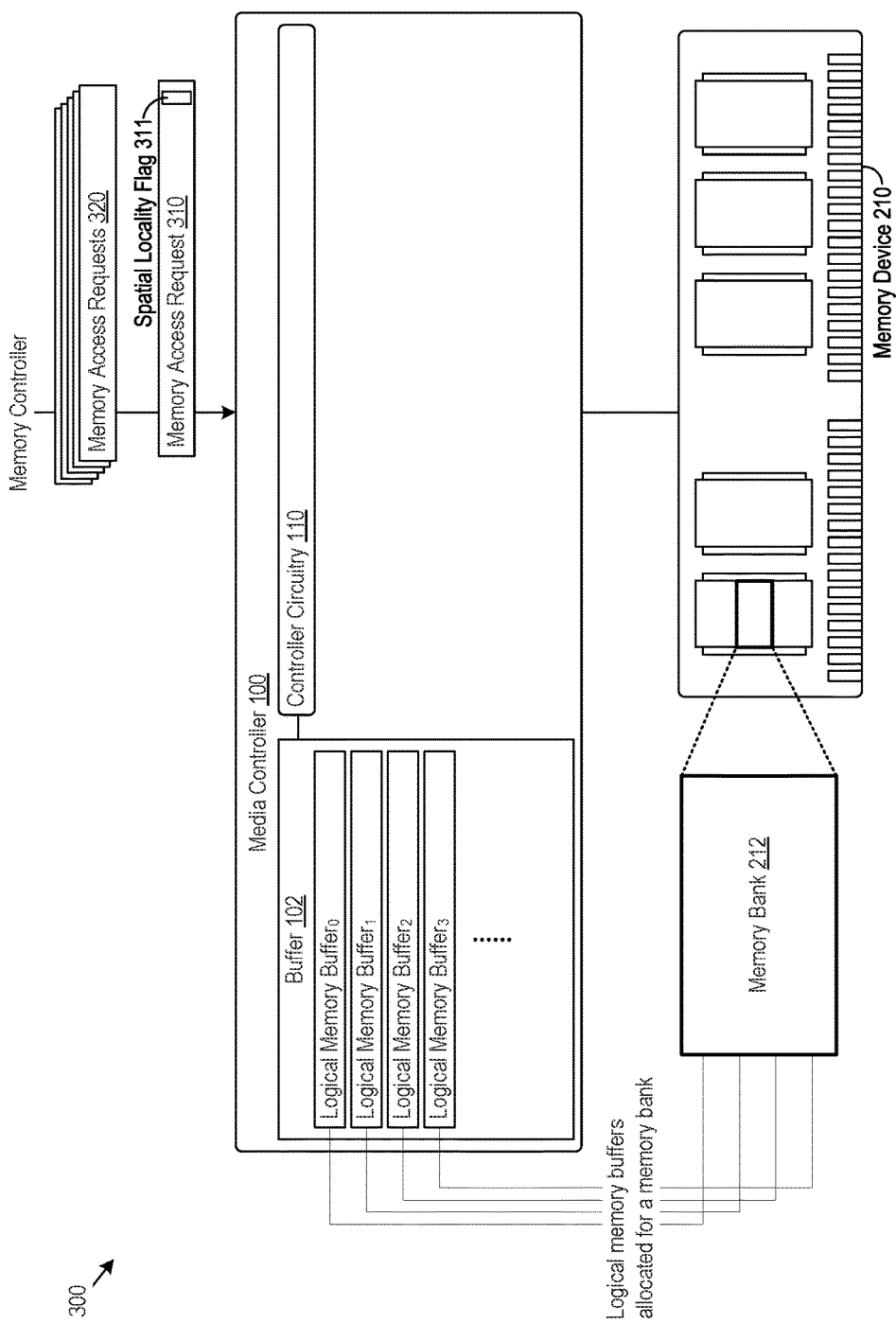
FIG. 3 shows an example of a system that supports processing of memory access requests with a spatial locality flag through use of logical memory buffers of a media controller.

FIG. 3 shows an example of a system 300 that supports processing of memory access requests with a spatial locality flag through use of logical memory buffers of a media controller 100. In the example shown in FIG. 3, a media controller 100 includes a buffer 102 and controller circuitry 110. The buffer 102 includes logical memory buffers allocated for memory banks of a memory device 210, including the logical memory buffers shown as Logical Memory Buffer$_0$, Logical Memory Buffer$_1$, Logical Memory Buffer$_2$, and Logical Memory Buffer$_3$ allocated for the memory bank 212.

In FIG. 3, the media controller 100 may receive a memory access request 310 from a memory controller. The memory access request 310 may include a spatial locality flag 311, which may be take the form of a bit value of a request header or any other value embedded within the memory access request 310. The spatial locality flag 311 of a memory access request may indicate if the memory access request is one of multiple memory access requests targeting a common locality of memory, e.g., targeting a particular logical memory buffer, a particular address range, or a continuous section of memory. In some examples, the common locality of memory referred to by the spatial locality flag 311 is characterized by a range size. The range size may indicate the size of the common locality of memory, whether in data size (e.g., in a number of bytes), address range (e.g., 64 consecutive memory addresses), or in any other way. Accordingly, setting of the spatial locality flag 311 may indicate the memory amount or the address range size for which a set of memory access requests may sequentially access data from.

When the spatial locality flag 311 is not set (e.g., with a value of 0b), the controller circuitry 110 may determine that the memory access request 310 is a single request accessing a particular logical memory buffer, and process the memory access request 310 accordingly. During or after processing of the memory access request 310, the controller circuitry 110 may release the logical memory buffer targeted by the memory access request 310 for other operations, and may do so as the spatial locality flag 311 indicates that subsequent memory access requests may not necessarily target the logical memory buffer.

When the spatial locality flag 311 is set (e.g., with a value of 1b), the controller circuitry 110 may determine that subsequent memory access requests will access the same common locality of memory, and may thus determine that at least some of the subsequent memory accesses will also target the logical memory buffer targeted by the memory access request 310. In FIG. 3, with the spatial locality flag 311 set, the memory access requests 320 subsequently sent by the memory controller may target the same logical memory buffer as the memory access request 310.

In some scenarios, the controller circuitry 110 may take preemptive operations responsive to identifying that the spatial locality flag 311 is set. As an example, the controller circuitry 110 may determine that the memory access request 310 targets data stored at an end portion of a particular logical memory buffer and prefetch data subsequent to the data stored at the end portion from the memory device prior to receiving another of the multiple requests targeting the particular logical memory buffer.

To illustrate, the memory access request 310 shown in FIG. 3 may have a spatial locality flag 311 that is set and target Logical Memory Buffer$_2$ shown in FIG. 3, which may be mapped to the memory bank 212. As illustrative parameters, the Logical Memory Buffer$_2$ may store 256 bytes of data (which may be referenced as bytes 0-255). The memory access request 310 may target the end portion of Logical Memory Buffer$_2$, such as bytes 192-255 of the Logical Memory Buffer$_2$. Responsive to a determination that the spatial locality flag 311 is set, the controller circuitry 110 may expect subsequent memory access requests among the requests 320 to target the next contiguous 256 byte range from the memory bank 212 mapped to Logical Memory Buffer$_2$. As such, the controller circuitry 110 may automatically prefetch the subsequent 256 bytes of data from the memory bank 212 for buffering in Logical Memory Buffer$_2$, e.g., prior to receiving the subsequent memory access requests 320. Doing so may reduce the latency in processing the subsequent memory access requests 320 and improve memory performance.

As noted above, a range size for a spatial locality flag may indicate the size of the common locality of memory for which a set of memory access requests will access data from. The controller circuitry 110 may support multiple spatial locality range sizes and determine the range size tied to different memory addresses or memory devices managed by a media controller 100. For instance, a media controller 100 may manage large capacity memory components that may include vast address ranges and multiple different types of memory media. The controller circuitry 110 may set different spatial locality range sizes for memory access requests depending on the specific memory portion targeted by the memory access requests.

The particular spatial locality range size tied to a memory element may vary depending on an intended use or characteristic of the memory element. For a memory element provisioned for random memory accesses, the controller circuitry 110 may set a reduced spatial locality range size. For a memory element provisioned for sequential, contiguous accesses, the controller circuitry 110 may set an increased spatial locality range size. As illustrative examples, the media controller 100 may manage a hybrid memory component including both DRAM and non-volatile memory. The DRAM may be provisioned for efficient random memory access, and the controller circuitry 110 may therefore determine a smaller spatial locality range size (e.g., 16 bytes). The non-volatile memory may be provisioned for efficient memory streaming access, and the controller circuitry 110 may therefore determine a larger spatial locality range size (e.g., 512 bytes). As such, the controller circuitry 110 may flexibly adapt spatial locality range sizes dependent on the particular memory media memory access requests target.

Figure 4:
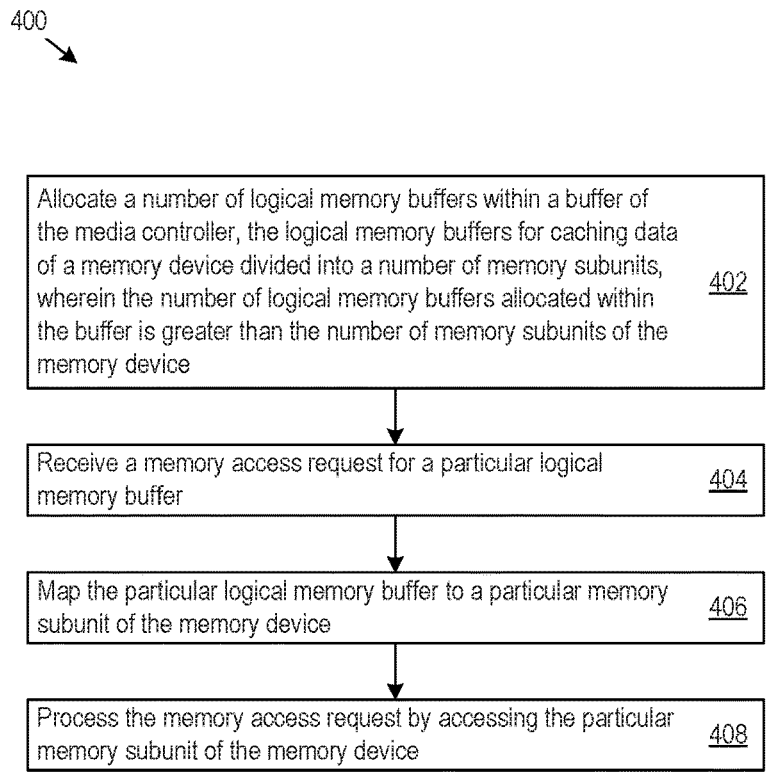
FIG. 4 shows an example of logic that a device may implement to support allocation and use of logical memory buffers of a media controller.

FIG. 4 shows an example of logic 400 that a device may implement to support allocation and use of logical memory buffers of a media controller 100. A media controller 100 may implement the logic 400 as hardware, for example as part of controller circuitry 110. In some implementations, the controller circuitry 110 executes the logic 400 as a method for processing memory access requests using allocated logical memory buffers. In the description below, execution and implementation of the logic 400 is discussed with reference to the controller circuitry 110, though any other suitable circuitry or hardware may consistently implement the features of the logic 400.

The controller circuitry 110 may allocate a number of logical memory buffers within a buffer 102 of the media controller 100, the logical memory buffers for caching data of a memory device divided into a number of memory subunits, wherein the number of logical memory buffers allocated within the buffer is greater than the number of memory subunits of the memory device (402). Then, the controller circuitry 110 may receive a memory access request for a particular logical memory buffer (404). To process the memory access request, the controller circuitry 110 may determine the particular logical memory buffer maps to a particular memory subunit of the memory device (406) and process the memory access request by accessing the particular memory subunit of the memory device (408).

The controller circuitry 110 may access the particular memory subunit when the requested data (such as a read request) is not already stored in the particular logical memory buffer, e.g., in a cache-miss scenario. When the requested data is already stored in the particular logical memory buffer, the controller circuitry 110 may process the memory access request without accessing the particular memory subunit, e.g., in a cache-hit scenario.

In some examples, the controller circuitry 110 may receive multiple memory access requests for the particular logical memory buffer and process the multiple memory access requests to particular logical bank buffer through a single access to the particular memory subunit of the memory device. As another example, the controller circuitry 110 may concurrently write back data content of a different logical buffer also mapped to the particular memory subunit while processing the memory access request to the particular memory subunit for the particular logical memory buffer.

Although one example was shown in FIG. 4, the logic 400 may be ordered in various ways. Likewise, the logic 400 may include any number of additional or alternative elements as well, including elements implementing any other logical memory buffer features described herein with respect to the media controller 100, including the controller circuitry 110.

Figure 5:
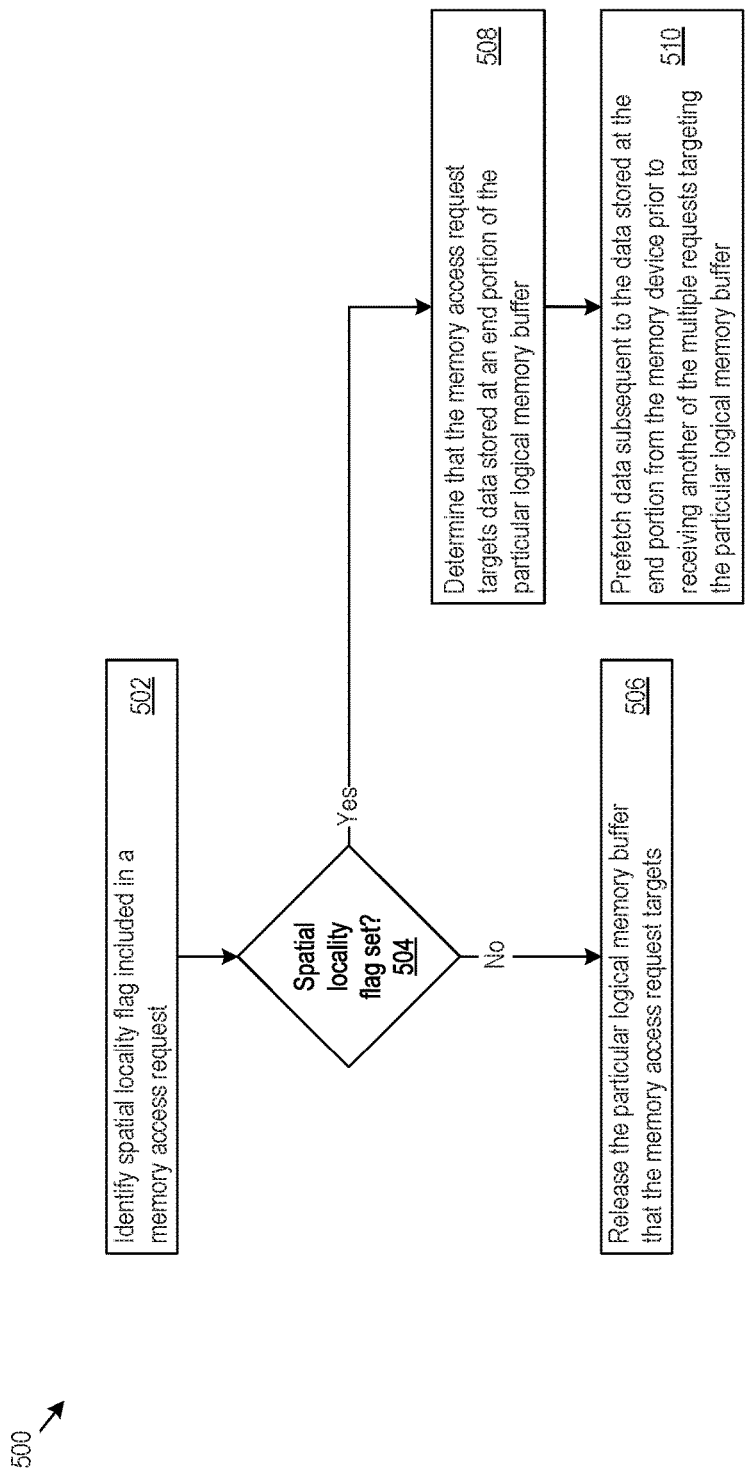
FIG. 5 shows an example of logic that a device may implement to support processing of memory access requests with a spatial locality flag through use of logical memory buffers of a media controller.

FIG. 5 shows an example of logic 500 that a device may implement to support processing of memory access requests with a spatial locality flag through use of logical memory buffers of a media controller 100. A media controller 100 may implement the logic 500 as hardware, for example as part of controller circuitry 110. In some implementations, the controller circuitry 110 executes the logic 500 as a method for processing memory access requests using allocated logical memory buffers. In the description below, execution and implementation of the logic 500 is discussed with reference to the controller circuitry 110, though any other suitable circuitry or hardware may consistently implement the features of the logic 500.

In implementing or executing the logic 500, the controller circuitry 110 may receive a memory access request and identify a spatial locality flag included in the memory access request (502). The controller circuitry 110 may also identify whether the spatial locality flag is set or not set (504). As noted above, the spatial locality flag may indicate if the memory access request is one of multiple requests targeting a common locality of memory.

Responsive to identifying that the spatial locality flag for the memory access request is not set, the controller circuitry 110 may release the particular logical memory buffer that the memory access request targets (506), for example after processing the memory access request. In the case the particular logical memory buffer maps to a memory subunit of a volatile memory device (e.g., a memory bank of a DRAM module), the controller circuitry 110 may schedule a precharge operation for the memory subunit.

Responsive to identifying that the spatial locality flag for the memory access request is set, the controller circuitry 110 may process the memory access request, and in some scenarios take a preemptive action for a subsequent memory access request also targeting the particular logical memory buffer. One such scenario may occur when the controller circuitry 110 determines that the memory access request targets data stored at an end portion particular logical memory buffer (508). In such a scenario, the controller circuitry 110 may prefetch data subsequent to the data stored at the end portion from the memory device, and do so prior to receiving another of the multiple requests targeting the particular logical memory buffer (510).

Although one example was shown in FIG. 5, the logic 500 may be ordered in various ways. Likewise, the logic 500 may include any number of additional or alternative elements as well, including elements implementing any other logical memory buffer features described herein with respect to the media controller 100, including the controller circuitry 110.

The systems, methods, devices, controllers, circuitry, and logic described above, including the media controller 100 and the controller circuitry 110, may be implemented in many different ways in many different combinations of hardware, logic, circuitry, and executable instructions stored on a machine-readable medium. For example, the media controller 100 or the controller circuitry 110, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. The processing capability of the systems, devices, and circuitry described herein, including the media controller 100 and the controller circuitry 110, may be distributed among multiple system components, such as among multiple processors and memories, which may include multiple distributed processing systems.

While various examples have been described herein, more implementations are possible.

The invention claimed is:

1. A media controller comprising:
a buffer; and
controller circuitry to:
receive, from a memory device linked to the media controller and storing data over a plurality of memory banks, an indication of a number of the memory banks of the memory device;
allocate, within the buffer, a plurality of logical memory buffers to each memory bank, a number of the logical memory buffers for the memory device greater than the number of memory banks, each logical memory buffer allocated to a particular one of the memory banks; and
indicate to a memory controller that a number of memory units accessible for the memory device is the number of logical memory buffers allocated for the memory device,
wherein requests address the data stored within the memory banks by logical memory buffer, and the logical memory buffers allocated to each memory bank appear as separate memory banks.

2. The media controller of claim 1, wherein the controller circuitry is further to map a particular memory bank of the memory device to multiple logical memory buffers.

3. The media controller of claim 1, wherein the controller circuitry is further to:
receive a memory access request from the memory controller, the memory access request targeting a particular logical memory buffer allocated for the memory device;
determine a particular memory bank of the memory device that the particular logical memory buffer maps to; and
perform the memory access request on the particular memory bank.

4. The media controller of claim 1, wherein the controller circuitry is further to:
receive a first memory access request from the memory controller, the first memory access request targeting a first logical memory buffer allocated for the memory device;
receive a second memory access request from the memory controller, the second memory access request targeting a second logical memory buffer allocated for the memory device;
determine that both the first and second logical memory buffers map to a particular memory bank of the memory device; and
process the first and second memory access requests for the particular memory bank in parallel.

5. A method comprising:
through a media controller:
allocating a plurality of logical memory buffers, within a buffer of the media controller, to each memory bank of a plurality of memory banks of a memory device, the memory device storing data over the memory banks, wherein a number of logical memory buffers allocated within the buffer for the memory device is greater than a number of the memory banks of the memory device, each logical memory buffer allocated to a particular one of the memory banks, and the logical memory buffers of each memory bank appear as separate memory banks;
receiving a memory access request specifying and for a particular logical memory buffer;
determining the particular logical memory buffer maps to a particular memory bank of the memory device; and
processing the memory access request by accessing the particular memory bank of the memory device,
wherein requests address the data stored within the memory banks by logical memory buffer.

6. The method of claim 5, comprising receiving multiple memory access requests for the particular logical memory buffer; and
processing the multiple memory access requests to the particular logical memory buffer through a single access to the particular memory bank of the memory device.

7. The method of claim 5, further comprising:
identifying that a spatial locality flag for the memory access request is set, the spatial locality flag indicating if the memory access request is one of multiple requests targeting a common locality of memory;
determining that the memory access request targets data stored at an end portion of the particular logical memory buffer; and
prefetching data subsequent to the data stored at the end portion from the memory device prior to receiving another of the multiple requests targeting the particular logical memory buffer.

8. The method of claim 5, further comprising:
identifying that a spatial locality flag for the memory access request is not set, the spatial locality flag indicating if the memory access request is one of multiple requests targeting a common locality of memory; and
releasing the particular logical memory buffer.

9. The method of claim 5, further comprising
concurrently writing back data content of a logical buffer different from the particular logical memory buffer that is also mapped to the particular memory bank while processing the memory access request to the particular memory bank for the particular logical memory buffer.

10. A system comprising:
a memory device storing data over a plurality of memory banks;
a media controller comprising:
a buffer; and
controller circuitry to:
determine a number of the memory banks of the memory device;
allocate a number of logical memory buffers within the buffer to each memory bank to cache data for the memory banks of the memory device, wherein the number of allocated logical memory buffers is greater than the number of memory banks of the memory device, each logical memory buffer allocated to a particular one of the memory banks; and
indicate to a memory controller that a number of memory units accessible for the memory device is the number of logical memory buffers allocated for the memory device, wherein requests address the data stored within the memory banks by logical memory buffer, and the logical memory buffers of each memory bank appear as separate memory banks.

11. The system of claim 10, wherein the controller circuitry is further to:
   receive multiple memory access requests targeting a particular logical memory buffer; and
   process the multiple memory access requests in parallel through a single access to a particular memory bank that the particular logical memory buffer maps to.

12. The system of claim 10, wherein the controller circuitry is further to, during an idle period for a particular memory bank:
   utilize a set of logical memory buffers allocated to a particular memory bank to perform a background operation, the background operation comprising a refresh operation of volatile memory media of the memory device, a data scrubbing operation of the memory device, or any combination thereof.

13. The system of claim 10, wherein the controller circuitry is further to:
   map a particular memory bank of the memory device to multiple logical memory buffers;
   determine that a memory access request received by the media controller targets one of the multiple logical memory buffers; and
   process the memory access request by accessing the particular memory bank.

14. The system of claim 10, wherein the controller circuitry is further to:
   identify that a spatial locality flag for a memory access request received by the media controller is set, the spatial locality flag indicating if the memory access request is one of multiple requests targeting a common locality of memory;
   determine that the memory access request targets data stored at an end portion of a particular logical memory buffer; and
   prefetch data subsequent to the data stored at the end portion from the memory device prior to receiving another of the multiple requests targeting the particular logical memory buffer.

15. The system of claim 10, wherein the controller circuitry is further to:
   identify that a spatial locality flag for a memory access request received by the media controller is not set, the spatial locality flag indicating if the memory access request is one of multiple requests targeting a common locality of memory; and
   release a particular logical memory buffer that the memory access request targets.

16. The system of claim 10, wherein the memory banks comprise a dynamic random access memory (DRAM) bank; and
   wherein the controller circuitry is further to:
      receive multiple memory access requests targeting a particular logical memory buffer allocated for the DRAM bank; and
      perform a lazy precharge operation on the DRAM bank in processing the multiple memory access requests.

17. The system of claim 10, wherein the controller circuitry is further to:
   receive memory access requests targeting the logical memory buffers, the memory access requests part of a particular workload; and
   adapt an allocation of the logical memory buffers according to a characteristic of the particular workload.

18. The system of claim 17, wherein the controller circuitry is to adapt the allocation by increasing the number of allocated logical memory buffers, decreasing the number of allocated logical memory buffers, or adjusting a size of the logical memory buffers.

19. The system of claim 17, wherein the controller circuitry is further to:
   indicate adaptation of the logical memory buffers to the memory controller by indicating an adapted number of logical memory buffers, an adjusted size of the logical memory buffers, or both.

* * * * *